United States Patent
Thomas et al.

(10) Patent No.: US 12,243,029 B1
(45) Date of Patent: Mar. 4, 2025

(54) SYSTEMS AND METHODS FOR DYNAMICALLY PROVIDING FLOAT FUNDS FOR GIG-ECONOMY WORKERS

(71) Applicant: UIPCO, LLC, San Antonio, TX (US)

(72) Inventors: Anto Chirayil Thomas, Coppell, TX (US); Subhalakshmi Selvam, Allen, TX (US); Charlotte Thomas Creech, San Antonio, TX (US); Nathan Lee Post, Rockport, TX (US); Mathew Cyriac Kottoor, San Antonio, TX (US); Nina Cooper, San Antonio, TX (US); Reynaldo Medina, III, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 13 days.

(21) Appl. No.: 18/307,634

(22) Filed: Apr. 26, 2023

Related U.S. Application Data

(60) Provisional application No. 63/336,066, filed on Apr. 28, 2022.

(51) Int. Cl.
   *G06Q 20/10* (2012.01)
(52) U.S. Cl.
   CPC .................................. *G06Q 20/10* (2013.01)

(58) Field of Classification Search
   CPC ...................................................... G06Q 20/10
   See application file for complete search history.

(56) References Cited

U.S. PATENT DOCUMENTS

| | | | |
|---|---|---|---|
| 11,682,084 B1 * | 6/2023 | Chen ..................... | G06T 11/206 705/30 |
| 2022/0358600 A1 * | 11/2022 | Zhu ........................ | G06Q 40/12 |
| 2023/0008975 A1 * | 1/2023 | Crudele .............. | H04W 12/126 |

* cited by examiner

*Primary Examiner* — Scott C Anderson
(74) *Attorney, Agent, or Firm* — Fletcher Yoder, P.C.

(57) ABSTRACT

A computing system acquires a plurality of gig-income models for a plurality of gig-workers, and each of the plurality of gig-income models includes a corresponding expected income for a respective gig-worker of the plurality of gig-workers over a period of time. The computing system identifies groups of gig-workers to join an income float pool based on the gig-income models of the gig-workers. The computing system transfers funds into or out from an account associated with a gig-worker in the income float pool in response to detecting, from one or more data sources, a difference between an actual income and an expected income of the gig-worker during an additional period of time. Thus, the gig-worker receives a relatively stable income.

20 Claims, 3 Drawing Sheets

SYSTEMS AND METHODS FOR DYNAMICALLY PROVIDING FLOAT FUNDS FOR GIG-ECONOMY WORKERS

CROSS-REFERENCE TO RELATED APPLICATIONS

This application claims priority to U.S. Provisional Application No. 63/336,066, filed Apr. 28, 2022, entitled "SYSTEMS AND METHODS FOR DYNAMICALLY PROVIDING FLOAT FUNDS FOR GIG-ECONOMY WORKERS," the disclosure of which is incorporated by reference herein in its entirety for all purposes.

BACKGROUND

The present disclosure relates generally to systems and methods for dynamically managing funds. More specifically, the present disclosure relates to dynamically managing funds for gig-workers based on expected earnings.

The proliferation of the gig economy has created a large number of Gig-workers. These gig-workers may have monthly incomes that vary over time. As such, it becomes difficult for these gig-workers to predict their monthly incomes and pay for expected expenses while employed in the gig economy.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more data sources. The system may include a computing system including a processor configured to receive a plurality of gig-income models for a plurality of gig-workers, and each of the plurality of gig-income models includes a corresponding expected income for a respective gig-worker of the plurality of gig-workers over a period of time. The processor may be configured to identify a first group of the plurality of gig-workers based on a first portion of the plurality of gig-income models, and each of the first group of the plurality of gig-workers corresponds to a first respective expected income range that exceeds a threshold for the period of time. The processor may be configured to identify a second group of the plurality of gig-workers based on a second portion of the plurality of gig-income models, and each of the second group of the plurality of gig-workers corresponds to a second respective expected income range that is below the threshold for the period of time. The processor may be configured to send an invitation to a respective computing device associated with each gig-worker of the first group and the second group, and the invitation is configured to cause the respective computing device to present a notification including an input field corresponding to accepting a request to join an income float pool. The processor may be configured to receive a plurality of acceptances from at least a portion of the first group and the second group, and each of the plurality of acceptances includes account information associated with a respective gig-worker. The processor may also be configured to transfer funds from a first account associated with a first gig-worker of the first group to a second account associated with a second gig-worker of the second group in response to detecting from the one or more data sources that the first gig-worker receives an actual income over an additional period of time more than an expected income over the additional period of time.

In one embodiment, a method may include receiving, via at least one processor, a plurality of gig-income models for a plurality of gig-workers, and each of the plurality of gig-income models includes a corresponding expected income for a respective gig-worker of the plurality of gig-workers over a period of time. The method may include identifying a first group of the plurality of gig-workers based on a first portion of the plurality of gig-income models, and each of the first group of the plurality of gig-workers corresponds to a first respective expected income range that exceeds a threshold for the period of time. The method may include identifying a second group of the plurality of gig-workers based on a second portion of the plurality of gig-income models, and each of the second group of the plurality of gig-workers corresponds to a second respective expected income range that is below the threshold for the period of time. The method may include sending an invitation to a respective computing device associated with each gig-worker of the first group and the second group, and the invitation is configured to cause the respective computing device to present a notification including an input field corresponding to accepting a request to join an income float pool. The method may include receiving a plurality of acceptances from at least a portion of the first group and the second group, and each of the plurality of acceptances includes account information associated with a respective gig-worker. The method may also include transferring funds from a first account associated with a first gig-worker of the first group to a second account associated with a second gig-worker of the second group in response to detecting from one or more data sources that the first gig-worker receives an actual income over an additional period of time more than an expected income over the additional period of time.

In one embodiment, a non-transitory, computer readable medium may include instructions for a processor to perform operations. The operations may include receiving a plurality of gig-income models for a plurality of gig-workers, and each of the plurality of gig-income models includes a corresponding expected income for a respective gig-worker of the plurality of gig-workers over a period of time. The operations may include identifying a first group of the plurality of gig-workers based on a first portion of the plurality of gig-income models, and each of the first group of the plurality of gig-workers corresponds to a first respective expected income range that exceeds a threshold for the period of time. The operations may include identifying a second group of the plurality of gig-workers based on a second portion of the plurality of gig-income models, and each of the second group of the plurality of gig-workers corresponds to a second respective expected income range that is below the threshold for the period of time. The operations may include sending an invitation to a respective computing device associated with each gig-worker of the first group and the second group, and the invitation is configured to cause the respective computing device to present a notification including an input field corresponding to accepting a request to join an income float pool. The operations may include receiving a plurality of acceptances from at least a portion of the first group and the second group, and each of the plurality of acceptances includes account information associated with a respective gig-worker. The operations may also include transferring funds from a first account associated with a first gig-worker of the first group to a second account associated with a second gig-worker of the second group in response to detecting from one or more data sources that the first gig-worker receives an actual income over an additional period of time more than an expected income over the additional period of time.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
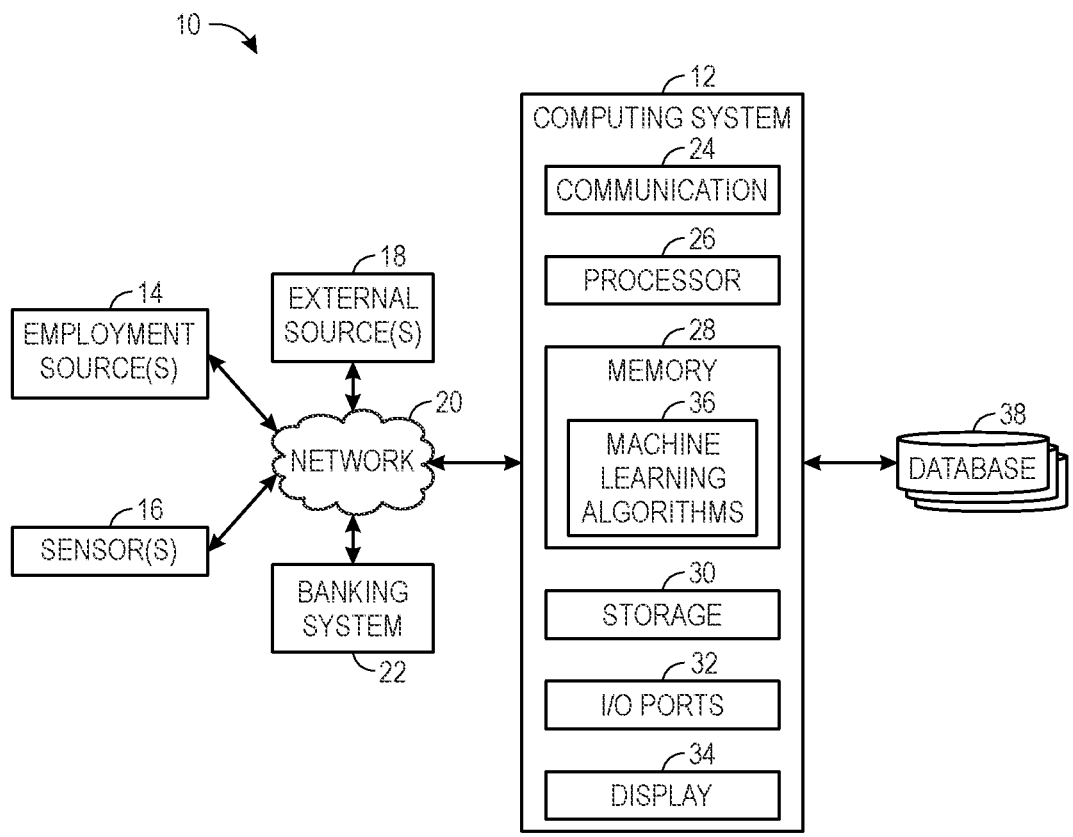
FIG. 1 illustrates a block diagram of a computing system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

Employees of many businesses may have an employer-employee relationship in which the employees are paid bi-weekly, monthly, or at some regular interval based on the employee's yearly salary. Gig-workers, on the other hand, are independent contractors, online platform workers, contract firm workers, and the like that may enter into agreements with on-demand companies to provide services to the company's clients. However, these on-demand jobs may not provide a stable income as the gig-workers' pay is dependent on demand for the respective services during a certain time period. As such, it may be beneficial to provide systems and methods for floating funds (e.g., loans) to these gig-workers to account for the income fluctuation that may be part of working in the gig-economy, thereby helping the gig-workers receive a relatively stable and predictable income.

With this in mind, the embodiments described herein may include systems and methods for using a fund management system to provide notifications and recommendations for a banking system to float or provide funds (e.g., loans) to an account of a gig-worker based on expected income deficiencies or surpluses during a time period. That is, the fund management system may perform certain payment or withdrawal actions based on data related to an expected income of the gig-worker. The expected income is a projection or prediction of earnings of the gig-worker during a certain period. The fund management system may determine the expected income for the gig-worker based on data received from a variety of data sources. The fund management system may determine the expected income for the gig-worker based on employment data (e.g., category, type, work time, duration, payment, location, and so forth) received from employment sources (e.g., employers database, employment calendars/schedules, employment applications, and so forth) that are related to the employment of the gig-worker. The fund management system may also determine the expected income for the gig-worker based on external data (e.g., weather, social events, public health, and so forth) received from external sources (e.g., weather broadcast, social media, news, and so forth) that are not directly related to the employment of the Gig-worker. The fund management system may also employ sensor data received from sensors (e.g., electrical sensors, temperature sensors, motion sensors, sound sensors, location sensors, image sensors, RFID sensors, beacons, and so forth) that monitor the gig-worker's employment activities or earnings (e.g., sensors used in a car for ride-share driver, sensors installed or disposed on a mobile device for a delivery service worker, and so forth) to determine the expected income for the gig-worker. By using these data sources, the fund management system may dynamically determine and update the expected income for the gig-worker based on real-time data related to current conditions that may affect the gig-worker's ability to earn money during a certain period of time.

The expected income of the gig-worker may decrease or increase due to various reasons (e.g., weather, public health, social events, and so forth), which may cause fluctuations in the expected income. The expected income fluctuations may be positive when the expected incomes increase, and the expected income fluctuations may be negative when the expected incomes drop. In addition, the expected income of gig-workers working in different types of work or working for different clients may have different expected income fluctuations during a same period. The expected income fluctuation may cause income shortage for the gig-worker when the expected income drops. To help the gig-worker receive a consistent or an expected amount of income, the fund management system may determine a deficiency amount (e.g., loan) for the gig-worker based on the expected income of the gig-worker in a certain period. The fund management system may provide float funds to cause the expected income to increase in case the expected income is projected to be lower than some value during the certain period.

In certain embodiments, the fund management system may generate a gig-income model for the gig-worker to better determine the expected income for the gig-worker. With this in mind the fund management system may generate gig-income models based on data collected from the variety of data sources, such as the employment data received from the employment sources, the external data received from the external sources, and the sensor data generated by the sensors used to monitor the employment activities of the gig-worker. By way of example, the employment sources may provide historical employment data of the gig-worker during a period, and the external sources may provide historical external data during the period. The fund management system may identify the correlations between the historical income data of the gig-worker and the historical external data, and predict expected income of the gig-worker under a similar situation. For example, the fund management system may correlate the historical income data of the Gig-worker with the historical weather data in a same time period and predict expected income of the gig-worker when a similar weather condition is present in the future during the same time period (e.g., spring, summer, holiday weekend). In another example, the fund management system may correlate the historical income data of the gig-worker with the employment data and predict the expected income of a certain types of gig-workers during a certain time. In some embodiments, the fund management system may utilize machine-learning algorithms or other identifying techniques to identify the correlations between the expected income of the gig-worker and the data collected from the variety of data sources.

In some embodiments, real time employment data generated by the employment sources may be received by the fund management system and used to determine the expected income of the Gig-worker. In addition, real time external data generated by the external sources may be received by the fund management system and used to determine the expected income of the gig-worker. In some embodiments, real time sensor data generated by sensors (e.g., electrical sensors, temperature sensors, motion sensors, sound sensors, location sensors, image sensors, RFID sensors, beacons, and so forth) used to monitor the employment activities of the gig-worker may be received by the fund management system and used to update the expected income of the gig-worker based on real time data. The sensors may be integrated or disposed in devices, such as network devices, intelligent electronic devices, smart appliances, smart devices, mobile devices, wearable devices, and the like. Moreover, the sensors may be installed at work places (e.g., fields, buildings, rooms, vehicles, and so forth) of the gig-worker and powered by a battery (e.g., rechargeable battery, either standing alone or connected to a power system, which may be charged when power is available), or by a power supply, or by an additional power supply (e.g., power backup system, solar panel power system, and so forth), or any combination of them (e.g., converting to other power supply methods when there is an outage on one power supply).

With this in mind, the fund management system may generate a dynamically updated gig-income model to determine the expected income of the gig-worker. The dynamically updated gig-income model may also be used to predict a deficiency in the expected income and ensure that the float fund may be present to accommodate the deficiency. As will be discussed in more detail below, the fund management system may determine the float fund amount (e.g., loan) for the gig-worker based on the expected income of the Gig-worker in the certain period. The float fund may be varied corresponding to the expected income to provide a stable total income (i.e., a total value of the expected income and the expected fund) for the gig-worker in the certain period.

In certain embodiments, the fund management system may be coupled to another existing monitoring system of the gig-worker, or may be stand-alone. In addition, in certain embodiments, the fund management system may be installed on a mobile device. In addition, in certain embodiments, sensors used in the fund management system may be relocatable with respect to Gig-workers that are being monitored. In certain embodiments, the fund management system may be used to monitor the Gig-worker for a period of time. As such, the fund management system may work on a demand (e.g., for a certain period), may be coupled to other existing monitoring systems, may be portable, and so forth.

By way of introduction, FIG. 1 illustrates a block diagram of a fund management system 10, which includes a variety of data sources that may be employed by the embodiments described herein. For example, the fund management system 10 may include a computing system 12 communicatively coupled to the variety of data sources that may assist the fund management system 10 to determine the expected income of the gig-worker. The variety of data sources may include employment sources 14, sensors 16, and external sources 18. The computing system 12 may receive data from the variety of data sources directly or through a network 20. The network 20 may facilitate communication between the computing system 12 and the variety of data sources. For example, the network 20 may be communicatively coupled to the employment sources 14, the sensors 16, and the external sources 18. The computing system 12 may send notifications or recommendations of management actions related to the expected fund of the gig-worker to a banking system 22. In some embodiments, the computing system 12 may send instructions to the banking system 22 to automatically implement the management actions (e.g., automatically send the expected fund to the gig-worker) via a wire transfer, an update to a distributed ledger (e.g., block chain), an automatic clearing house (ACH) transaction, or the like. In some embodiments, the network 20 may also be communicatively coupled to the banking system 22.

In certain embodiments, the computing system 12 may include various types of components that may assist the computing system 12 in performing the various types 'of functions described herein. For example, in certain embodiments, the computing system 12 may include a communication component 24, a processor 26, memory media 28, storage media 30, input/output (I/O) ports 32, a display 34, machine learning algorithms 36 that may be executed by the processor 26, and the like.

In certain embodiments, the communication component 24 may be a wireless or wired communication component that may facilitate communication between the computing system 12 and various devices via the network 20, the Internet, or the like. For example, in certain embodiments, the communication component 24 may allow the computing system 12 to obtain data from the variety of data sources, such as the employment sources 14, the sensors 16, the external sources 18, or a database 38, either directly or indirectly through the network 20. In certain embodiments, the communication component 24 may receive and send notifications to devices, either directly or indirectly through the network 20. In addition, in certain embodiments, the communication component 24 may use a variety of communication protocols, such as Open Database Connectivity (ODBC), TCP/IP protocol, Distributed Relational Database Architecture (DRDA) protocol, Database Change protocol (DCP), HTTP protocol, other suitable current or future protocols, or combinations thereof.

The processor 26 may process instructions for execution within the computing system 12. The processor 26 may include single-threaded processor(s), multi-threaded processor(s), or both. In certain embodiments, the processor 26 may process instructions stored in the memory media 28. The processor 26 may also include hardware-based processor(s), each including one or more cores. The processor 26 may include general purpose processor(s), special purpose processor(s), or both. The processor 26 may be communicatively coupled to other internal components of the computing system 12, such as the communication component 24, the storage media 30, the I/O ports 32, and the display 34.

The memory media 28 and the storage media 30 may be any suitable articles of manufacture that can serve as media to store processor-executable code, data, or the like. These articles of manufacture may represent computer-readable media (e.g., any suitable form of memory or storage) that may store the processor-executable code used by the processor 26 to perform the presently disclosed techniques. The memory media 28 and the storage media 30 may represent non-transitory computer-readable media (e.g., any suitable form of memory or storage) that may store the processor-executable code used by the processor 26 to perform various techniques described herein. It should be noted that non-transitory merely indicates that the media is tangible and not a signal.

The I/O ports 32 may be interfaces that may couple to other peripheral components such as input devices (e.g., keyboard, mouse, and so forth), the sensors 16, input/output (I/O) modules, and the like. The display 34 may operate as a human machine interface (HMI) to depict visualizations associated with software or executable code being processed by the processor 26. In one embodiment, the display 34 may be a touch display capable of receiving inputs from an operator of the computing system 12. The display 34 may be any suitable type of display, such as a liquid crystal display (LCD), plasma display, or an organic light emitting diode (OLED) display, for example. Additionally, in one embodiment, the display 34 may be provided in conjunction with a touch-sensitive mechanism (e.g., a touch screen) that may function as part of a control interface for the computing system 12. It should be noted that the components described above with regard to the computing system 12 are examples and the computing system 12 may include additional or fewer components relative to the illustrated embodiment.

In certain embodiments, the computing system 12 may determine an expected income for a gig-worker based on employment data (e.g., category, type, work time, duration, payment, location, and so forth) received from the employment sources 14, which may include employer databases, employment calendars/schedules, employment applications, and other sources of employment data that are related to the employment of the gig-worker. In some embodiments, the employment sources may include data available from an employer regarding monthly or periodic payment amounts, taxes withheld from payments, time periods in which the employee performs gig-oriented tasks (e.g., ride share, food delivery), percentage of time periods that the employee performs tasks during surge pricing (e.g., demand exceeds expected demand and results in higher rates for services), and the like. Based on the data available from the employment sources 14, the computing system 12 may determine an expected income for a gig-worker based on previous employment data and payment data.

In addition, the computing system 12 may determine the expected income for the gig-worker based on external data (e.g., weather, social events, public health, and so forth) received from the external sources 18 that are not directly related to the employment of the gig-worker. That is, the external data may include data that affects the demand for services in the gig-economy. For example, raining or high precipitation weather may often correspond to an increased demand in food delivery requests. As such, weather forecasts may provide help the computing system 12 to predict the expected income of the gig-worker.

In addition, the computing system 12 may determine the expected income for the gig-worker based on sensor data received from the sensors 16, which may collect real-time data regarding the gig-worker, the gig-worker's vehicle, the gig-worker's surroundings, or the like. The sensors 16 may include electrical sensors, temperature sensors, motion sensors, sound sensors, location sensors, image sensors, RFID sensors, beacons, and so forth. The data acquired from the sensors 16 may be used to monitor the gig-worker's employment activities or earnings (e.g., sensors used in a car for a ride share driver, sensors installed or disposed on a mobile device for a food/grocery delivery worker. For instance, the sensors 16 may include a vehicle sensor that tracks the mileage driven by the vehicle to better gauge the amount of time that the user drives the vehicle while performing gig-economy tasks. In some embodiments, the sensors 16 may be integrated or disposed in devices, such as network devices, intelligent electronic devices, smart appliances, smart devices, mobile devices, wearable devices, and the like. In certain embodiments, the sensors 16 may be installed at workplaces (e.g., fields, buildings, rooms, vehicles, and so forth) of the gig-worker.

In some embodiments, the computing system 12 may determine a float fund (e.g., loan) for the gig-worker based on the expected income of the gig-worker and a threshold income for the gig-worker. The threshold income may be defined by the gig-worker or determined using machine learning or other algorithms based on monthly expenditures listed in a bank statement, credit card statement, or the like. The gig-worker may also provide an input that corresponds to a living expense for the gig-worker in the certain period. In any case, the float fund may be calculated periodically based on the threshold income and the expected income for a future time period. The computing system 12 may provide the float fund to supplement the gig-worker's income and thus provide a stable or predictable periodic income (i.e., a total value of the expected income and the expected fund) for the gig-worker in the future time period. In addition, the computing system 12 may withhold funds to maintain a separate balance to provide future float funds when the gig-worker receives an income that is higher than the threshold income.

In certain embodiments, the computing system 12 may send notifications to the banking system 22 to notify/ recommend a management action related to the float fund, such as sending the float fund to an account of the gig-worker after detecting that the expected income of the gig-worker will be less than the threshold income. In certain embodiments, the computing system 12 may send instructions to cause the banking system 22 to automatically implement the management actions (e.g., transferring the float fund to an account via a distributed ledger transaction).

With the foregoing in mind, the computing system 12 may generate a gig-income model for a gig-worker based on data received from the employment sources 14, the external sources 18, the sensors 16, and the like. The gig-income model may assist the computing system 12 or other suitable computing system in determining a float amount to save or provide for the gig-worker.

Figure 2:
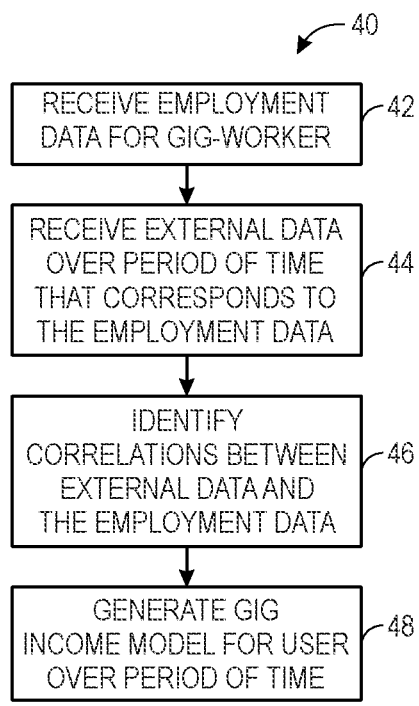
FIG. 2 illustrate a flow chart of a method for generating a gig-income model for a gig-worker based on data acquired from the data sources of FIG. 1, in accordance with embodiments described herein.

By way of example, FIG. 2 illustrates a method 40 for generating a gig-income model for the gig-worker based on data acquired from the variety of data sources of FIG. 1. The computing system 12 may perform operations via the processor 26 based on processor-executable code stored in the memory media 28 and/or the storage media 30 as described in detail herein. The processor 26 may execute the processor-executable code to receive the data and conduct analysis as described in detail herein. Although the example described in FIG. 2 is described in a particular order, it should be noted that the example method may be performed in any suitable order and is not limited to the order presented herein. It should also be noted that although each processing block is described below in the example method as being performed by the computing system 12, other suitable systems may perform the methods described herein.

Referring now to FIG. 2, at block 42, the computing system 12 may receive the employment data (e.g., category, type, work time, duration, payment, location, and so forth) for the gig-worker from the employment sources 14 (e.g., employers' database, employment calendars/schedules, employment applications). The employment data may include location data, working schedule data, payment data, and the like related to the gig-work performed by the gig-worker over a period of time. The employment data may track the routes taken by the gig-worker, the types of tasks accepted by the gig-worker, the type of tasks rejected by the gig-worker, time periods (e.g., day, night) that the gig-worker worked regularly, and the like. In addition, the employment data may include payment data that provides information related to an amount of funds (e.g., via employment, via tips) that the gig-worker receives during certain periods of time (e.g., weeks of year, months of year). In some embodiments, the computing system 12 may receive the employment data from the gig-worker that inputs employment data into the computing system 12 or via another computing device connected to the computing system 12 the network 20.

At block 44 of the FIG. 2, the computing system 12 may receive the external data (e.g., weather, social events, public health, and so forth) from the external sources 18 (e.g., weather broadcast, social media, news, and so forth). The external data may affect the expected income of the gig-worker. For instance, weather data, the presence of social events in a geographical area, a pandemic event occurring in an area, and the like may cause the demand for gig-worker services to increase or decrease. As such, the reception of real-time external data may enable the computing system 12 to account for external influences that may affect the amount of requests for services that the gig-worker may receive. In addition, the external data may include historical data that may provide demand data related to various seasons (e.g., holiday seasons), weather patterns, events, and the like that occur regularly in a geographic region. For instance, two weeks of a year in a particular city may correspond to a time period in which the city hosts a music festival that tourists from outside the city attend. The regular occurrence of this festival may correspond to an increase in ride-share requests and thus an increase in expected income for the gig-worker during the same period in the future. As such, the external data may be used to determine the expected income for the gig-worker.

At block 46 of the FIG. 2, the computing system 12 may identify correlations between the external data and the employment data. In some embodiments, the employment sources 14 may provide historical employment data of the gig-worker during a period, and the external sources 8 may provide historical external data during the period. The computing system 12 may identify the correlations between the historical employment data of the gig-worker and the historical external data, and predict an expected income of the gig-worker under similar time periods, circumstances, and the like. For example, the computing system 12 may correlate the historical employment data of the gig-worker with the historical weather data during a similar time period. In this way, the gig income model may be used to predict the expected income of the gig-worker during similar weather events during the same time period in the future. In another example, the fund management system 10 may correlate the historical income data of the gig-worker with the employment data and predict the expected income of a certain types of gig-workers during a certain time period. In some embodiments, the computing system 12 may utilize machine-learning algorithms or other identifying techniques to identify the correlations between the income of the gig-worker and the data collected from the variety of data sources.

At block 48, the computing system 12 may generate a gig-income model for the gig-worker based on the correlations identified at block 46. The gig-income model may include the correlative data that details the relationships between incomes of gig-workers and other data points, such as various time periods, locations, weather events, social events, and other types of data. In this way, the gig-income model may assist the computing system 12 to determine the expected income during similar periods of time, events, or the like in the future.

In certain embodiments, the computing system 12 may continuously monitor the employment sources 14 and the external sources 18 to receive the updated employment data and updated external data. In some embodiments, the gig-worker may update the employment data by inputting the updated employment data into the computing system 12 either directly or through the network 20. The computing system 12 may apply the updated employment data and the updated external data to dynamically update the gig-income model.

With the foregoing in mind, the banking system 22 or other suitable organization providing the float funds may limit the amount of its personal assets (e.g., funds, cash) to provide as float funds. As such, in some embodiments, the float funds may be acquired via a float pool that may include a number of accounts for a number of gig-workers. That is, different gig-workers may have surpluses or deficiencies as compared to their respective income thresholds during a certain period of time. As such, the funding organization may identify these gig-workers and predict the surpluses and deficiencies based on respective gig-income models. The funding organization may then use surpluses to provide for the gig-workers who are expecting deficiencies. Although the surpluses may not enable the funding organization to cover all of the float funds, the surpluses may decrease the use of the funding organizations' liquid assets.

By way of example, the computing system 12 may receive gig-income models for multiple gig-workers and determine expected income for each gig-worker over period of times based on the gig-income models. The computing system 12 may identify a group of Gig-workers to join an income float pool. The income float pool may have mix of gig-workers who has gig-work cycles that counterbalance income deficiencies for other gig-workers. For instance, the expected income of gig-workers working in different types of work or working for different clients may have different expected income fluctuations during a same period. For example, the expected income for a ride-share driver may be less than the respective income threshold during a public health problem (e.g., pandemic) period compared to than an average income for the driver during time periods without the public health problem. At the same time, during the same public health problem period, the expected income for a food or grocery delivery gig-worker may be more than the respective average income for the worker because more people may use the food delivery service to avoid the public health problem.

In some embodiments, some of the gig-worker in the income float pool may contribute a surplus fund to the income float funds during a certain period. The surplus fund may be determined based on a comparison between an actual income of the gig-worker in a payment period and a rolling average of the expected incomes of a gig-worker over periods of time. The rolling average may include a moving average that is updated periodically over a period of time to more accurately determine the current status of the income of the gig-worker. The gig-workers in the income float pool having actual incomes less than the respective rolling average may receive respective additional funds from the income float pool, which are contributed by other gig-workers having actual incomes more than the respective rolling average (i.e., surplus funds) in the payment period. In some embodiments, the banking system 22 may add the respective additional funds received by the respective gig-workers from the income float pool to the respective gig-workers' current account (e.g., current loan account).

Figure 3:
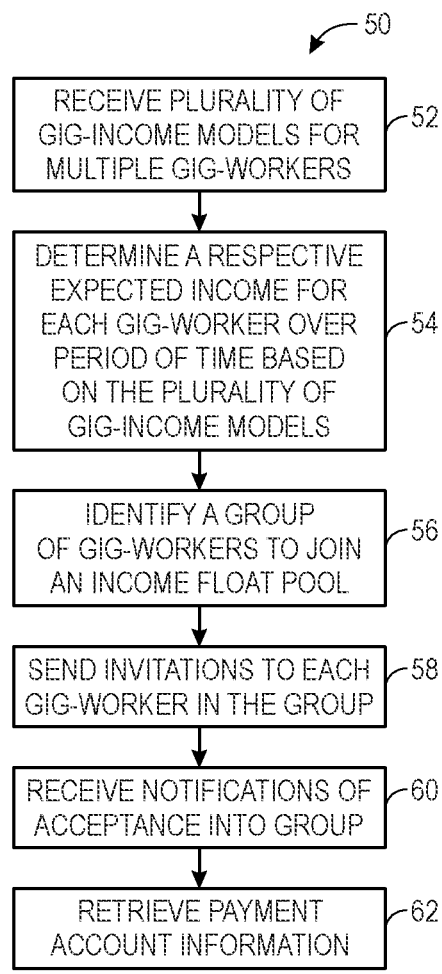
FIG. 3 illustrates a flow chart of a method for generating an income float pool by using the gig-income model described in FIG. 2, in accordance with embodiments described herein.

With the foregoing in mind, FIG. 3 illustrates a method 50 for identifying groups of gig-workers to join an income float pool by using gig-income models generated for each gig-worker in the income float pool described in FIG. 2. Before continuing, it should be noted that although the method 50 is described as being performed by the computing system 12, the method 50 may be performed by any suitable computing device. Moreover, although the method 50 is described in a particular order, it should be understood that the method 50 may be performed in any suitable order.

Referring now to FIG. 3, at block 52 of the FIG. 3, the computing system 12 may receive gig-income models for gig-workers from the employment sources 14, the banking system 22, the storage media 30, the database 38, the network 20, and the like. As mentioned above, the gig-income models may provide expected incomes for gig-workers over future periods of time. At block 54, the computing system 12 may determine the expected income for each of the gig-workers over a subsequent period of time (e.g., month, weeks) based on the respective gig-income model. In certain embodiments, the computing system 12 may store the expected income for each of the Gig-workers in the storage media 30, the database 38, or the network 20.

At block 56, the computing system 12 may identify a group of gig-workers that may benefit from being part of an income float pool. In some embodiments, the computing system 12 may identify the group of gig-workers based on the expected income for each of the gig-workers over period of time. The income float pool may have mix of gig-workers that work in different sectors of the gig-economy, different locations (e.g., cities) within the gig-economy, different times (e.g., day hours, night hours), and the like. The mix of gig-workers may participate in gig-work that include work cycles that counterbalance income deficiencies for a portion of the gig-workers in the group.

For instance, the expected income of gig-workers working in different types of work may have different expected income fluctuations during a same period. The computing system 12 may identify different numbers of gig-workers working in different types of work in the group based on the employment data (e.g., category, type, work time, duration, payment, location, and so forth) so that work cycles of the group of gig-workers may counterbalance income deficiencies. For example, gig-workers working in type A work (type A workers) may have positive expected income fluctuations, and gig-workers working in type B work (type B workers) may have negative expected income fluctuations during the same period (e.g., the type B workers may have decreased expected income during the same period that the type A workers may have increased expected income). Thereby, putting the type A workers and the type B workers in the same group may counterbalance income deficiencies in different types of work (e.g., type A work and type B work) during the same period. In some embodiments, the type A workers may have smaller values of expected income fluctuations than the type B workers during the same period (e.g., the decrease in the expected incomes of the type B workers may be more than the increase in the expected incomes of the type A workers), thereby, more A workers may be included in the group than B workers to counterbalance income deficiencies caused by the B workers during a special period. The computing system 12 may identify more than one income float pools for a certain gig-worker. In some embodiments, the computing system 12 may utilize machine learning algorithm algorithms or other identifying techniques to identify the group of Gig-workers to be included in the income float pool.

At block 58, the computing system 12 may send invitations to identified gig-workers to join the income float pool. The computing system 12 may send more than one invitation to the certain gig-worker. In some embodiments, the computing system 12 may send a respective invitation from each of the more than one income float pools to the certain gig-worker. The invitation may be received by a computing device, an application, or some other processing device that may cause the device to automatically present a notification (e.g., visual alert, haptic alert, audible alert) to inform the gig-worker of the selection. Moreover, the notification may include an input field that may receive user input (e.g., via the visualization) that may enable the user to accept the invitation.

At block 60, the computing system 12 may receive one or more acceptance notification responses from one or more of the identified gig-workers in the group. After receiving the acceptances, at block 62, the computing system 12 may retrieve payment account information from the devices of the gig-workers. In some embodiments, the payment account information may include account data associated with the banking system 22 or other financial institutions that may allow the computing system 12 to transmit electronic payments between accounts. In some embodiments, the acceptance of the notification transmitted by the computing device of a respective gig-worker may include payment account information, such as an account number, an indication of a block in a blockchain, or other suitable account data to facilitate providing and receiving payments to and from the banking system 22 or some other institution. In some embodiments, the payments may be facilitated via a smart contract stored on the respective blockchain. That is, the smart contract may monitor for scenarios as described herein and automatically execute a payment, a withdrawal, or both based on certain conditions being present. In general, blocks are added to the blockchain in a linear, chronological order by one or more computing devices in a peer-to-peer network of interconnected computing devices that execute a blockchain protocol. A blockchain constantly grows as completed blocks are added with a new set of transactions (e.g., smart contracts). The blockchain protocol provides a secure and reliable method of updating the blockchain, copies of which are distributed across the peer-to-peer network, without use of a central authority. In some examples, a passport may be provided for verifying identity in blockchain transactions. A passport may store data that digitally associates an individual (e.g., a gig-worker) with a single digital token. In some instances, a passport may be issued by a trusted authority. The trusted authority may be any entity that is recognized as trustworthy by various parties involved in blockchain transactions. An authority may issue a passport after verifying that an individual is who they claim to be, and the authority may associate the individual's identity with a blockchain address. Subsequently, the individual may use the passport to establish their identity in a blockchain transaction, such as to sign a smart contract stored in a blockchain.

In addition, smart contracts that are part of the blockchain may receive data from other components, such that the smart contract may determine whether a condition (e.g., expected income is less than threshold) is present and may perform an action in response to detecting the condition. As such, the smart contracts may interact with other blockchains to perform various actions (e.g., transfer funds) in response to detecting the respective conditions.

Figure 4:
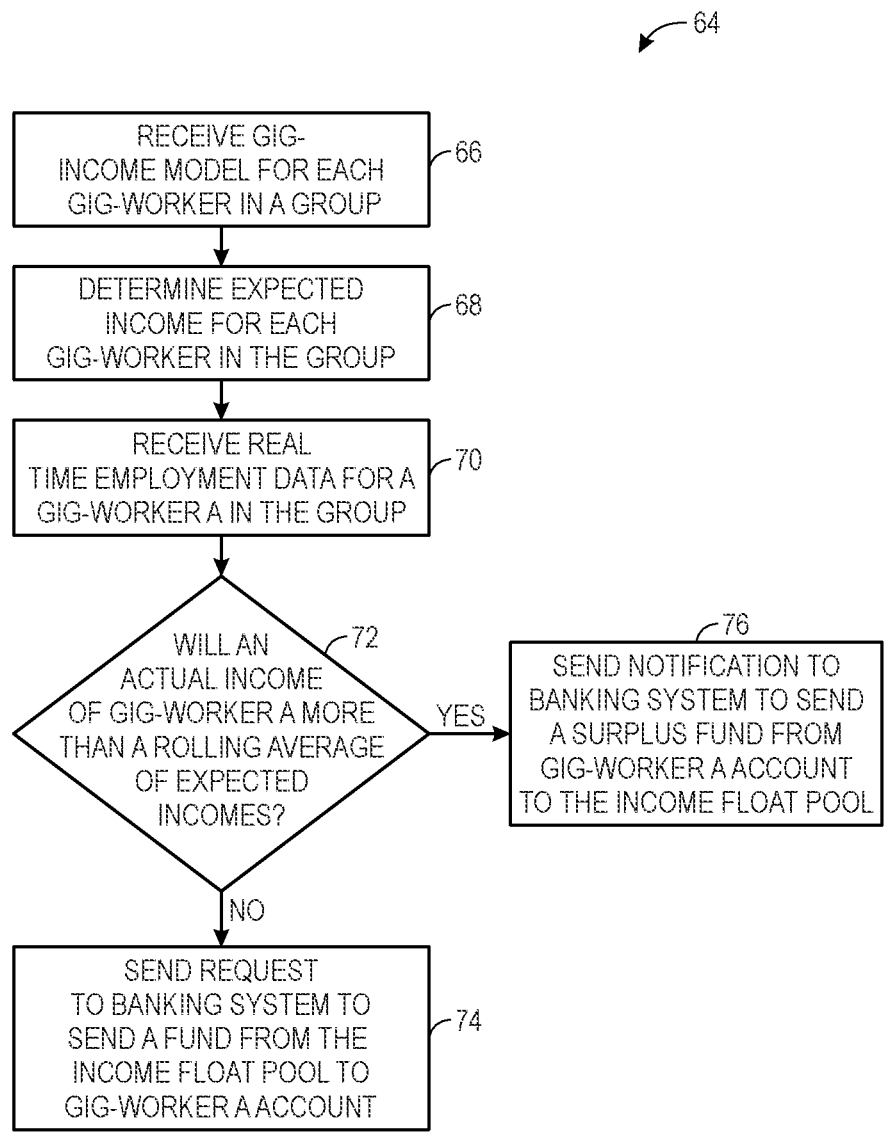
FIG. 4 illustrates a flow chart of a method for managing funds for gig-workers in the income float pool, in accordance with embodiments described herein.

After identifying the groups for the gig-workers, the computing system 12 may monitor the income of the members of the group and automatically withdraw and pay different members according to expected surpluses and deficiencies. Keeping this in mind, FIG. 4 illustrates a method 64 of managing funds for the group of gig-workers in the income float pool. Like the method 50 described above, it should be noted that although the method 64 is described as being performed by the computing system 12, the method 64 may be performed by any suitable computing device. Moreover, although the method 64 is described in a particular order, it should be understood that the method 64 may be performed in any suitable order.

At block 66, the computing system 12 may receive the gig-income models for the gig-workers in the income float pool from the employment sources 14, the banking system 22, the storage media 30, the database 38, the network 20, and the like. At block 68, the computing system 12 may determine the expected income for each of the Gig-workers in the income float pool over subsequent period of time based on the respective gig-income models. In certain embodiments, the computing system 12 may store the expected income for each of the Gig-workers in the storage media 30, the database 38, or the network 20.

At block 70, the computing system 12 may receive real time employment data (e.g., category, type, work time, duration, payment, location, and so forth) for the gig-workers from the employment sources 14 (e.g., employers database, employment calendars/schedules, employment applications, and so forth). In addition, the sensors 16 may be used to monitor the real time employment data or conditions in which the gig-worker may be operating. The real time employment data may include location data, working schedule data, payment data, and the like. In some embodiments, the computing system 12 may receive the real time employment data from the gig-worker (e.g., gig-worker inputs employment data into the computing system 12), either directly or through the network 20.

At block 72, the computing system 12 may determine whether an actual income for a gig-worker during a certain period will be greater than the expected income for the period based on a respective real time employment data received for the gig-worker and the gig-income model for the gig-worker. The actual income may be determined based on actual earnings of the gig-worker during the certain period as collected via the data sources described above. If the actual income is expected to be greater than the expected income, the computing system 12 may proceed to block 76 and send a notification to the banking system 22 to cause the banking system 22 to withdraw funds from an account associated with the respective gig-worker based on the expected surplus. The withdrawn funds may be collected into an account that corresponds to the income float pool for the group of gig-workers.

At block 76, the computing system 12 may send notifications of management actions to the banking system 22 to send a surplus fund from the corresponding gig-worker's account to the income float pool. In some embodiments, the surplus funds are contributed by gig-workers having actual incomes more than the respective expected income (i.e., surplus funds) in the payment period. In some embodiments, the banking system 22 may transfer the surplus funds directly among the gig-workers in the income float pool (i.e., qualified Gig-worker B may borrow the surplus funds directly from Gig-worker A) by using shared smart contracts. The term smart contract refers to a distributed program that may be stored in a blockchain that may be used to digitally facilitate, verify, and/or enforce the negotiation or performance of a contract, while ensuring that the smart contract transactions are trackable and irreversible. Blockchains are continuously growing lists of records (e.g., blocks), which are linked and secured using cryptography. The use of a blockchain infrastructure may allow a publicly accessible, tamper-proof, resilient, and auditable platform for storage and tracking of transactions among the gig-workers in the income float pool.

Referring back to block 72, if the actual income is expected to be lower than the expected income, the computing system 12 may proceed to block 74 and may send requests to the banking system 22 or other financial institution to cause the banking system 22 to send respective additional funds to the gig-worker from an account that corresponds to the income float pool. In some embodiments, the banking system 22 may add the respective additional funds from the income float pool to the respective gig-worker's current account (e.g., current loan account).

In certain embodiments, an additional fund for a gig-worker may be determined based on the difference between the respective rolling average and the respective actual income of the gig-worker, i.e., income shortage, and a total fund available in the income float pool. In some embodiments, the additional fund may be distributed based on an equal distribution among gig-workers qualified for the additional funds. In some embodiments, the additional fund may be distributed based on the respective income shortage of each Gig-worker qualified for the additional funds (e.g., the more the income shortage is, the more the additional fund is). As such, the computing system 45 may enable the banking system 22 to obtain funds (i.e., the surplus funds) to contribute to the income float pool, and the gig-workers in the income float pool may help each other by contributing/receiving funds to/from the income float pool.

In some embodiments, the banking system 22 may implement the management actions automatically in response to receiving notifications and recommendations of management actions. For example, the banking system 22 may automatically send funds to the gig-worker's account. Further, the use of the smart contracts may further allow the computing system 12 to perform several management actions automatically in a transparent manner as described above.

While only certain features of the invention have been illustrated and described herein, many modifications and changes will occur to those skilled in the art. It is, therefore, to be understood that the appended claims are intended to cover all such modifications and changes as fall within the true spirit of the invention. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more data sources; and
a computing system, comprising a processor configured to:
create a plurality of gig-income models for a plurality of gig-workers by:
identifying one or more correlations between historical income data for each of the plurality of gig-workers and corresponding historical weather data during a period of time, wherein the historical weather data is associated with one or more changes in income of a respective gig-worker of the plurality of gig-workers during the period of time; and
predicting expected income data during an additional period of time occurring after the period of time based on the one or more correlations, wherein each of the plurality of gig-income models comprises a respective expected income for each gig-worker of the plurality of gig-workers over the additional period of time;
identify a first group of the plurality of gig-workers based on a first portion of the plurality of gig-income models, wherein each of the first group of the plurality of gig-workers corresponds to a first respective expected income range that exceeds a threshold for the additional period of time;
identify a second group of the plurality of gig-workers based on a second portion of the plurality of gig-income models, wherein each of the second group of the plurality of gig-workers corresponds to a second respective expected income range that is below the threshold for the additional period of time;
send an invitation to a respective computing device associated with each gig-worker of the first group and the second group, wherein the invitation is configured to cause the respective computing device to present a notification comprising an input field corresponding to accepting a request to join an income float pool;
receive a plurality of acceptances from at least a portion of the first group and the second group, wherein each of the plurality of acceptances comprises account information associated with a respective gig-worker;
receive, via one or more sensors, sensor data associated with a vehicle of a first gig-worker of the first group;
determine an actual income for the first gig-worker over the additional period of time based on the sensor data; and
automatically transfer funds from a first account associated with the first gig-worker of the first group to a second account associated with a second gig-worker of the second group via a distributed ledger in response to detecting that the first gig-worker receives the actual income over the additional period of time more than an expected income over the additional period of time.

2. The system of claim 1, comprising one or more external sources providing external data associated with weather, or social event, or news, or any combination thereof.

3. The system of claim 2, wherein a gig-income model for the first gig-worker is determined by applying a machine learning algorithm to one or more additional correlations between the expected income over the additional period of time and the external data.

4. The system of claim 1, wherein the sensor data is associated with the first gig-worker performing one or more employment activities.

5. The system of claim 1, wherein the one or more sensors comprise one or more electrical sensors, one or more temperature sensors, one or more motion sensors, one or more sound sensors, one or more location sensors, one or more image sensors, one or more radio-frequency identification (RFID) sensors, one or more beacons, or any combination thereof.

6. The system of claim 1, wherein the one or more sensors are positioned inside a vehicle.

7. The system of claim 1, wherein the one or more sensors are part of a mobile device.

8. The system of claim 1, wherein the first group and the second group correspond to different types of work.

9. The system of claim 1, wherein the first group and the second group correspond to different types of clients.

10. The system of claim 1, wherein the expected income comprises a rolling average of the expected income.

11. A method comprising:
creating, via at least one processor, a plurality of gig-income models for a plurality of gig-workers by:
identifying one or more correlations between historical income data for each of the plurality of gig-workers and corresponding historical weather data during a period of time, wherein the historical weather data is associated with one or more changes in income of a respective gig-worker of the plurality of gig-workers during the period of time; and
predicting expected income data during an additional period of time occurring after the period of time based on the one or more correlations, wherein each of the plurality of gig-income models comprises a respective expected income for each gig-worker of the plurality of gig-workers over the additional period of time;
identifying, via the at least one processor, a first group of the plurality of gig-workers based on a first portion of the plurality of gig-income models, wherein each of the first group of the plurality of gig-workers corresponds to a first respective expected income range that exceeds a threshold for the additional period of time;
identifying, via the at least one processor, a second group of the plurality of gig-workers based on a second portion of the plurality of gig-income models, wherein each of the second group of the plurality of gig-workers corresponds to a second respective expected income range that is below the threshold for the additional period of time;
sending, via the at least one processor, an invitation to a respective computing device associated with each gig-worker of the first group and the second group, wherein the invitation is configured to cause the respective computing device to present a notification comprising an input field corresponding to accepting a request to join an income float pool;
receiving, via the at least one processor, a plurality of acceptances from at least a portion of the first group and the second group, wherein each of the plurality of acceptances comprises account information associated with a respective gig-worker;
receiving, via one or more sensors, sensor data associated with a vehicle of a first gig-worker of the first group;
determining, via the at least one processor, an actual income for the first gig-worker over the additional period of time based on the sensor data; and
automatically transferring funds from a first account associated with the first gig-worker of the first group to a second account associated with a second gig-worker of the second group via a distributed ledger in response to detecting from one or more data sources that the first gig-worker receives the actual income over the additional period of time more than an expected income over the additional period of time.

12. The method of claim 11, comprising receiving, from one or more external sources, external data associated with weather, or social event, or news, or any combination thereof.

13. The method of claim 12, comprising applying a machine learning algorithm to one or more additional correlations between the expected income of the first gig-worker over the additional period of time and the external data.

14. The method of claim 11,
wherein the sensor data is associated with the first gig-worker performing one or more employment activities.

15. The method of claim 11, wherein the first group and the second group correspond to different types of work.

16. The method of claim 11, wherein the first group and the second group correspond to different types of clients.

17. A non-transitory, computer readable medium comprising instructions that, when executed by a processor, cause the processor to perform operations comprising:
creating a plurality of gig-income models for a plurality of gig-workers by:
identifying one or more correlations between historical income data for each of the plurality of gig-workers and corresponding historical weather data during a period of time, wherein the historical weather data is associated with one or more changes in income of a respective gig-worker of the plurality of gig-workers during the period of time; and
predicting expected income data during an additional period of time occurring after the period of time based on the one or more correlations, wherein each of the plurality of gig-income models comprises a respective expected income for each gig-worker of the plurality of gig-workers over the additional period of time;
identifying a first group of the plurality of gig-workers based on a first portion of the plurality of gig-income models, wherein each of the first group of the plurality of gig-workers corresponds to a first respective expected income range that exceeds a threshold for the additional period of time;
identifying a second group of the plurality of gig-workers based on a second portion of the plurality of gig-income models, wherein each of the second group of the plurality of gig-workers corresponds to a second respective expected income range that is below the threshold for the additional period of time;
sending an invitation to a respective computing device associated with each gig-worker of the first group and the second group, wherein the invitation is configured to cause the respective computing device to present a notification comprising an input field corresponding to accepting a request to join an income float pool;
receiving a plurality of acceptances from at least a portion of the first group and the second group, wherein each of the plurality of acceptances comprises account information associated with a respective gig-worker;
receiving, via one or more sensors, sensor data associated with a vehicle of a first gig-worker of the first group;
determining an actual income for the first gig-worker over the additional period of time based on the sensor data; and
automatically transferring funds from a first account associated with the first gig-worker of the first group to a second account associated with a second gig-worker of the second group via a distributed ledger in response to detecting from one or more data sources that the first gig-worker receives the actual income over the additional period of time more than an expected income over the additional period of time.

18. The non-transitory, computer readable medium of claim 17, wherein the instructions cause the processor to further perform the operations comprising receiving, from one or more external sources, external data associated with weather, or social event, or news, or any combination thereof.

19. The non-transitory, computer readable medium of claim 18, wherein the instructions cause the processor to further perform the operations comprising:
applying a machine learning algorithm to one or more additional correlations between the expected income of the first gig-worker over the additional period of time and the external data.

20. The non-transitory, computer readable medium of claim 17,
wherein the sensor data is associated with the first gig-worker performing one or more employment activities.

* * * * *